United States Patent Office 3,177,217
Patented Apr. 6, 1965

3,177,217
4,7-DIAMINO-N-(SUBSTITUTED)-2-ALKYLTHIO-6-PTERIDINECARBOXAMIDES
Thomas S. Osdene, West Chester, Pa., assignor to American Home Products Corporation, New York, N.Y., a corporation of Delaware
No Drawing. Filed Dec. 3, 1962, Ser. No. 241,487
3 Claims. (Cl. 260—251.5)

This invention is concerned with novel 6-pteridinecarboxamides having significant antiviral activity and with processes for making the same.

The compounds sought to be patented have valuable therapeutic applications and can be represented by the following general formula:

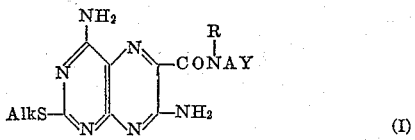

wherein AlkS represents a lower alkylthio radical having from 1 to 4 carbon atoms; R is hydrogen or alkyl; A is a straight chain or branched alkylene radical having 2 to 5 carbon atoms; Y is a di-lower alkylamino, a morpholinyl, piperidinyl, piperazinyl, or pyrrolidinyl radical.

The novel compounds of the present invention are prepared by the process generally illustrated by the following equation:

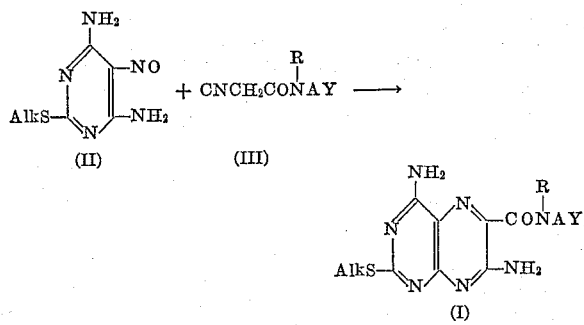

In the above formulas, AlkS, R, A, and Y have the same meaning previously set forth.

In practising the process outlined above, the compounds of this invention are prepared by heating under autogenous pressure in an anhydrous neutral polar solvent in the presence of a catalytic amount of an alkaline condensation agent approximately equimolar amounts of a 4,6-diamino-2-alkylthio-5-nitrosopyrimidine (II) and a 2-cyano-N-(substituted)acetamide (III). This reaction is carried out at a temperature within the range of about 60 to 200° C. but preferably at or near the boiling point of the reaction mixture. Neutral polar solvents suitable in the reaction of interest include methanol, propanol, ethanol, butanol, glycol ethers such as 2-methoxy ethanol, 2-ethoxy ethanol methoxy and ethoxy propanols as well as amides such as dimethylformamide, diethylformamide and dimethyl acetamide. Agents suitable for promoting the instant reaction include the alkali metals, their alkoxides and their alkoxyalkoxides. Preferred among these catalysts are sodium metal, sodium methoxide, potassium ethoxide and sodium α-ethoxy ethoxide.

When preparing the 4,7-diamino-N-(dialkylaminoalkyl)-2-alkylthio-6-pteridinecarboxamides according to the process of the invention, by heating a 4,6-diamino-2-alkylthio-5-nitrosopyrimidine and the appropriate 2-cyano-N-(substituted)acetamide, it should be noted that a precipitate forms after a short period of boiling. After cooling the reaction mass to room temperature, the precipitate is filtered off and dried. This material is extracted with absolute ethanol and the crude product precipitates upon cooling the alcohol extract.

All the products of this invention can be purified by dissolving them in a lower alkanol solvent such as ethanol or 2-ethoxyethanol.

The following examples, in which all temperatures are given in degrees centigrade, illustrate the best mode of practising the invention.

Example 1

To a solution of 0.2 g. of sodium metal in 500 ml. of absolute ethanol was added 9.25 g. of 4,6-diamino-2-methylmercapto-5-nitrosopyrimidine and the mixture was stirred mechanically and brought to the boil. To the mixture was added 10.83 g. of 2-cyano-N-(3-diethylaminopropyl)acetamide and the whole was boiled under reflux for 10 mins. during which time a precipitate was deposited. After cooling, the precipitate was removed by filtration and dried, wt.=10.8, M.P. 307° (effervescent). This material was placed into a Soxhlet extractor and was extracted with absolute ethanol. A crystalline substance was obtained on cooling of the alcoholic extract. Further recrystallization of the solid from 2-ethoxyethanol afforded 4,7-diamino-N-(3-diethylaminopropyl)-2-methylmercapto-6-pteridinecarboxamide, M.P. 305° C.

*Analysis.*—Calc.: C=49.43, H=6.64, N=30.75, S=8.79. Found: C=49.47, H=6.49, N=30.72, S=8.50.

Example 2

4,7-diamino-N-(2-dimethylaminoethyl)-2-methylmercapto-6-pteridinecarboxamide is prepared from 7.6 g. of 2-cyano-N-(2-dimethylaminoethyl) acetamide and 9.25 g. of 4,6-diamino-2-methylmercapto-5-nitrosopyrimidine following the procedure of Example 1.

Example 3

4,7-diamino-N-(2-diethylaminoethyl)-2-methylmercapto-6-pteridinecarboxamide is prepared from 9.1 g. of 2-cyano-N-(2-diethylaminoethyl) acetamide and 9.25 g. of 4,6-diamino-2-methylmercapto-5-nitrosopyrimidine following the procedure of Example 1.

Example 4

4,7-diamino-N-(3-dimethylaminopropyl)-2-methylmercapto-6-pteridinecarboxamide is prepared from 8.4 g. of 2-cyano-N-(3-dimethylaminopropyl) acetamide and 9.25 g. of 4,6-diamino-2-methylmercapto-5-nitrosopyrimidine following the procedure of Example 1.

Example 5

4,7-diamino-N-(ethyl-2-dimethylaminoethyl)-2-methylmercapto-6-pteridinecarboxamide is prepared from 9.0 g. of 2-cyano-N-(ethyl-2-dimethylaminoethyl) acetamide and 9.25 g. of 4,6-diamino-2-methylmercapto-5-nitrosopyrimidine following the procedure of Example 1.

The starting compounds listed below were treated following the above procedure to give the corresponding products hereinafter set forth:

| Starting Compounds | Products |
|---|---|
| 4,6-diamino-2-ethylmercapto-5-nitrosopyrimidine and 2-cyano-N-(2-di-isopropylaminoethyl) acetamide. | 4,7-diamino-N-(2-di-isopropylaminoethyl)-2-ethyl-mercapto-6-pteridinecarboxamide. |
| 4,6-diamino-2-propylmercapto-5-nitrosopyrimidine and 2-cyano-N-(3-di-n-butylaminopropyl) acetamide. | 4,7-diamino-N-(3-di-n-butylaminopropyl)-2-propylmercapto-6-pteridinecarboxamide. |
| 4,6-diamino-2-propylmercapto-5-nitrosopyrimidine and 2-cyano-N-(4-dimethylaminobutyl)-acetamide. | 4,7-diamino-N-(4-dimethylaminobutyl)-2-propylmercapto-6-pteridinecarboxamide. |
| 4,6-diamino-2-methylmercapto-5-nitrosopyrimidine and 2-cyano-N-(2-dimethylaminopropyl) acetamide. | 4,7-diamino-N-(2-dimethylaminopropyl)-2-methylmercapto-6-pteridinecarboxamide. |
| 4,6-diamino-2-methylmercapto-5-nitrosopyrimidine and 2-cyano-N-(2-morpholinoethyl)acetamide. | 4,7-diamino-N-(2-morpholinoethyl)-2-methylmercapto-6-pteridinecarboxamide. |
| 4,6-diamino-2-methylmercapto-5-nitrosopyrimidine and 2-cyano-N-(2-piperidinoethyl) acetamide. | 4,7-diamino-N-(2-piperidinoethyl)-2-methylmercapto-6-pteridinecarboxamide. |
| 4,6-diamino-2-methylmercapto-5-nitrosopyrimidine and 2-cyano-N-(2-pyrrolidinoethyl) acetamide. | 4,7-diamino-N-(2-pyrrolidinoethyl)-2-methylmercapto-6-pteridinecarboxamide. |
| 4,6-diamino-2-methylmercapto-5-nitrosopyrimidine and 2-cyano-N-(3-morpholinopropyl) acetamide. | 4,7-diamino-N-(-3-morpholinopropyl)-2-methylmercapto-6-pteridinecarboxamide. |
| 4,6-diamino-2-methylmercapto-5-nitrosopyrimidine and 2-cyano-N-(3-piperidinoethyl) acetamide. | 4,7-diamino-N-(3-piperidinopropyl)-2-methylmercapto-6-pteridinecarboxamide. |

The compounds of this invention show antiviral activity and are particularly useful in treating hepatitis in mammals.

What is claimed is:

1. A compound of the formula:

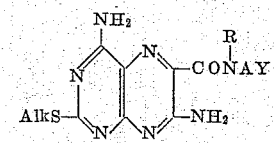

wherein AlkS represents a lower alkylthio radical; R is selected from the group consisting of hydrogen and lower alkyl; A is an unsubstituted alkylene radical having from 2 to 5 carbon atoms in the chain; and Y is selected from the group consisting of di-lower alkylamino, morpholino, piperidino and pyrrolidino.

2. 4,7-diamino-N-(diloweralkylaminoethyl) - 2 - lower alkylthio-6-pteridinecarboxamide.

3. 4,7-diamino-N-(2 - diethylaminoethyl) - 2 - methylmercapto-6-pteridinecarboxamide.

References Cited by the Examiner
UNITED STATES PATENTS 2,963,478  12/60  Weinstock _____ 260—251
3,028,387  4/62   Weinstock _____ 260—251

IRVING MARCUS, *Primary Examiner.*
NICHOLAS, S. RIZZO, WALTER A. MODANCE,
*Examiners.*